United States Patent
Kaneko et al.

(10) Patent No.: US 8,765,830 B2
(45) Date of Patent: Jul. 1, 2014

(54) POLYIMIDE FOAM AND METHOD FOR PRODUCING SAME

(75) Inventors: Yukio Kaneko, Yamaguchi (JP); Hiroaki Yamaguchi, Yamaguchi (JP); Masafumi Kohda, Yamaguchi (JP)

(73) Assignee: UBE Industries, Ltd., Yamaguchi (JP)

( * ) Notice: Subject to any disclaimer, the term of this patent is extended or adjusted under 35 U.S.C. 154(b) by 326 days.

(21) Appl. No.: 13/128,352

(22) PCT Filed: Nov. 12, 2009

(86) PCT No.: PCT/JP2009/069248
§ 371 (c)(1),
(2), (4) Date: May 27, 2011

(87) PCT Pub. No.: WO2010/055870
PCT Pub. Date: May 20, 2010

(65) Prior Publication Data
US 2011/0218265 A1 Sep. 8, 2011

(30) Foreign Application Priority Data

Nov. 13, 2008 (JP) ................... 2008-290917

(51) Int. Cl.
*C08J 9/00* (2006.01)
*C08G 73/10* (2006.01)

(52) U.S. Cl.
CPC ............... *C08J 9/00* (2013.01); *C08G 73/1042* (2013.01); *C08G 73/1067* (2013.01)
USPC ............................ 521/183; 521/182; 521/184

(58) Field of Classification Search
USPC .................................. 521/182, 184
See application file for complete search history.

(56) References Cited

U.S. PATENT DOCUMENTS

| | | | |
|---|---|---|---|
| 3,483,144 A | 12/1969 | Lavin et al. | |
| 3,554,939 A | 1/1971 | Lavin et al. | |
| 4,506,038 A | 3/1985 | Gagliani et al. | |
| 4,900,761 A | 2/1990 | Lee et al. | |
| 4,952,611 A | 8/1990 | Indyke | |
| 4,980,389 A | 12/1990 | Hill et al. | |
| 5,077,318 A | 12/1991 | Barringer et al. | |
| 5,096,932 A | 3/1992 | Barringer et al. | |
| 5,122,546 A * | 6/1992 | Lee .................................. 521/88 |
| 5,234,966 A | 8/1993 | Barringer et al. | |
| 6,133,330 A | 10/2000 | Weiser et al. | |
| 6,576,683 B2 | 6/2003 | Yamaguchi et al. | |

FOREIGN PATENT DOCUMENTS

| | | |
|---|---|---|
| JP | 59-145222 | 8/1984 |
| JP | 2-24326 | 1/1990 |
| JP | 2-229841 | 9/1990 |
| JP | 4-211440 | 8/1992 |
| JP | 4-225040 | 8/1992 |
| JP | 6-298936 | 10/1994 |
| JP | 2000-515584 | 11/2000 |
| JP | 2002-12688 | 1/2002 |
| JP | 2004-143378 | 5/2004 |
| JP | 2009-108243 | 5/2009 |

OTHER PUBLICATIONS

International Search Report, PCT/JP2009/069248, Dec. 8, 2009.
European Search Report—EP 09 82 6117—Sep. 3, 2013.
Otaigbe J U et al: "Influence of chemical structure of polyimide prepolymer on rheo-mechanical properties of polyimide foam composites", Polymer Composites, John Wiley & Sons, Hoboken, NJ, US, vol. 22, No. 1, Jan. 1, 2001, pp. 155-164, XP009171450, ISSN: 0272-8397, DOI, 10.1002/PC.10527 *table 1*.

* cited by examiner

*Primary Examiner* — Kara Boyle
(74) *Attorney, Agent, or Firm* — Young & Thompson

(57) ABSTRACT

Disclosed is a polyimide foam made of an aromatic polyimide composed of a tetracarboxylic acid component, which is composed of 0 to 90% by mole of a 3,3',4,4'-biphenyltetracarboxylic acid component and 100 to 10% by mole of a 3,3',4,4'-benzophenone tetracarboxylic acid component and/or a 2,3,3',4'-biphenyltetracarboxylic acid component, and a diamine component, which is composed of 50 to 97% by mole of m-phenylenediamine and 50 to 3% by mole of 4,4'-methylenedianiline. The polyimide foam can be produced easily, has uniform and fine cells, and has the mechanical properties required for practical use as a foam, such as flexibility that prevents the foam from cracking easily even when deformed and excellent cushioning properties, as well as heat resistance that can resist use at high temperatures.

14 Claims, No Drawings

POLYIMIDE FOAM AND METHOD FOR PRODUCING SAME

TECHNICAL FIELD

The present invention relates to a polyimide foam made of an aromatic polyimide having a specific chemical structure, and a method for producing the same. The polyimide foam can be produced easily, has uniform and fine cells, and preferably has the mechanical properties required for practical use as a foam, such as flexibility that prevents the foam from cracking easily even when deformed and excellent cushioning properties, as well as heat resistance that can resist use at high temperatures.

BACKGROUND ART

Studies are being made on polyimide foams because they are expected to have excellent properties, such as heat resistance, compared to other polymer foams. It is, however, difficult to produce polyimide foams, especially foams made of aromatic polyimides, and only limited types of aromatic polyimides with specific chemical structures can produce foams for practical use.

Patent Documents 1 and 2 disclose methods for producing polyimide foams using 3,3',4,4'-benzophenone tetracarboxylic acid diesters as tetracarboxylic acid components. The polyimide foams disclosed as preferred or concrete examples therein employ a combination of an aromatic diamine and a heterocycle diamine as the diamine components and have glass transition temperatures of 300° C. or below.

Patent Document 3 discloses the production of a polyimide foam wherein: a 3,3',4,4'-biphenyltetracarboxylic acid diester is complexed with an ether such as THF (by hydrogen bonding) to form a uniform solution with an aromatic diamine; and this uniform solution is used to prepare a polyimide precursor, from which the polyimide foam is produced. The disclosed polyimide foam made from the 3,3',4,4'-biphenyltetracarboxylic acid diester, however, has extremely coarse and non-uniform foam cells. The disclosed polyimide foam also lacks the mechanical properties required for practical use as a foam—e.g., it cannot deform easily and has poor cushioning properties because its expansion ratio is small (i.e., its apparent density is large). Further, either 3,4'-oxydianiline alone, or a combination of 3,4'-oxydianiline and 1,3-bis(3-aminophenoxy)benzene, is used as the diamine component(s), which respectively give glass transition temperatures of 250° C. and 261° C.

Patent Document 4 discloses a method for producing a polyimide foam employing a 2,3,3',4'-biphenyltetracarboxylic acid diester as a tetracarboxylic acid component. The diamine components concretely disclosed therein are a combination of an aromatic diamine, such as p-phenylenediamine, and diaminosiloxane.

Patent Document 1: JP-A-59-145222
Patent Document 2: JP-A-4-211440
Patent Document 3: JP-T-2000-515584
Patent Document 4: JP-A-2002-12688

SUMMARY OF INVENTION

Technical Problem

An aspect of the present invention proposes a novel polyimide foam made of an aromatic polyimide having a specific chemical structure, and a method for producing the same. The polyimide foam can be produced easily, has uniform and fine cells, and preferably has the mechanical properties required for practical use as a foam, such as flexibility that prevents the foam from cracking easily even when deformed and excellent cushioning properties, as well as heat resistance that can resist use at high temperatures.

Solution to Problem

Inventors have conducted extensive studies to find that the use of specific tetracarboxylic acid components and diamine components can produce a polyimide foam that is easy to produce, has uniform and fine cells, and preferably has the mechanical properties required for practical use as a foam, such as flexibility that prevents the foam from cracking easily even when deformed and excellent cushioning properties, as well as heat resistance that can resist use at high temperatures, thus arriving at the present invention.

That is, the invention relates to the following items:

1. A polyimide foam made of an aromatic polyimide having a repeating unit represented by chemical formula (1) shown below:

[Chem. 1]

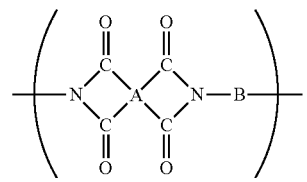

Chemical formula (1)

wherein, 0 to 90% by mole of A in the chemical formula (1) is a tetravalent unit based on a biphenyltetracarboxylic acid structure represented by chemical formula (2) shown below, and 100 to 10% by mole of A is a tetravalent unit based on a benzophenone tetracarboxylic acid structure represented by chemical formula (3) shown below and/or a tetravalent unit based on a biphenyltetracarboxylic acid structure represented by chemical formula (4) shown below:

[Chem. 2]

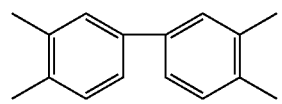

Chemical formula (2)

[Chem. 3]

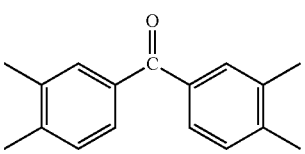

Chemical formula (3)

[Chem. 4]

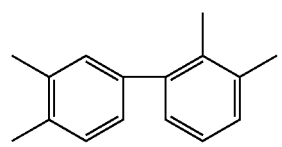

Chemical formula (4)

and 50 to 97% by mole of B in the chemical formula (1) is a divalent unit based on a m-phenylene structure represented by chemical formula (5) shown below, and 50 to 3% by mole of B is a divalent unit based on a diphenylmethane structure represented by chemical formula (6) shown below.

[Chem. 5]

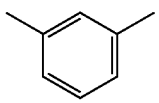

Chemical formula (5)

[Chem. 6]

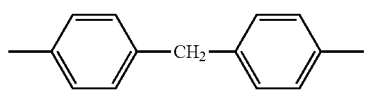

Chemical formula (6)

2. The polyimide foam according to Item 1, characterized by having at least such flexibility that no cracks appear when a specimen of the polyimide foam with a 1-by-1-cm cross section and a length of 5 cm is deformed until the specimen's opposite ends, in its length direction, come into contact with each other and the specimen is deformed into a ring.

3. The polyimide foam according to Item 1 or 2, characterized by having such cushioning properties that, when a 2-by-2-by-2-cm cubic specimen of the polyimide foam is compressed by applying a load on one surface of the specimen to a thickness of 0.2 cm, held in the compressed state for 30 seconds, and released from the load, the permanent strain in thickness is 30% or less.

4. The polyimide foam according to any one of Items 1 to 3, wherein the aromatic polyimide has a glass transition temperature of at least 300° C.

5. The polyimide foam according to any one of Items 1 to 4, characterized by having an expansion ratio of at least 75 times (an apparent density of 18.0 kg/m$^3$ or less).

6. A method for producing a polyimide foam, comprising:
preparing a polyimide precursor by uniformly dispersing an aromatic tetracarboxylic acid diester component composed of 0 to 90% by mole of a 3,3',4,4'-biphenyltetracarboxylic acid diester and 100 to 10% by mole of a 3,3',4,4'-benzophenone tetracarboxylic acid diester and/or a 2,3,3',4'-biphenyltetracarboxylic acid diester, and an aromatic diamine component composed of 50 to 97% by mole of m-phenylenediamine and 50 to 3% by mole of 4,4'-methylenedianiline; and
then heating the polyimide precursor.

7. The polyimide foam production method according to Item 6, wherein the polyimide precursor contains a polyimidization catalyst.

8. The polyimide foam production method according to Item 6, wherein the polyimide precursor contains a surfactant.

DESCRIPTION OF EMBODIMENTS

The tetracarboxylic acid component of the aromatic polyimide that composes the polyimide foam of the invention is composed of 0 to 90% by mole, preferably 40 to 90% by mole, more preferably 50 to 90% by mole, even more preferably 50 to 80% by mole, of a 3,3',4,4'-biphenyltetracarboxylic acid component and 100 to 10% by mole, preferably 60 to 10% by mole, more preferably 50 to 10% by mole, even more preferably 50 to 20% by mole, of a benzophenone tetracarboxylic acid component and/or a 2,3,3',4'-biphenyltetracarboxylic acid component.

A larger proportion of the 3,3',4,4'-biphenyltetracarboxylic acid component in the tetracarboxylic acid component can achieve favorable properties, such as heat resistance, hydrolysis resistance, alkali resistance, preferable glass transition temperature, and mechanical strength, and is thus preferable. When the proportion exceeds 90% by mole, however, it becomes difficult to prepare a uniform solution of the polyimide precursor composed of the tetracarboxylic acid diesters and the diamines for producing the polyimide foam (precipitation is prone to occur)—i.e., it becomes difficult to prepare a polyimide precursor in which the tetracarboxylic acid diesters and the diamines are dispersed uniformly (dispersed at a molecular level)—which makes it impossible to produce the polyimide foam easily.

In the invention, combinedly using the 3,3',4,4'-biphenyltetracarboxylic acid component with a benzophenone tetracarboxylic acid component and/or a 2,3,3',4'-biphenyltetracarboxylic acid component facilitates the preparation of a uniformly-dispersed polyimide precursor (dispersed at a molecular level) and thus allows suitable production of a polyimide foam. In addition, the favorable properties—such as heat resistance, hydrolysis resistance, alkali resistance, preferable glass transition temperature, and mechanical strength—that are attributed to the 3,3',4,4'-biphenyltetracarboxylic acid component can suitably be retained.

In the invention, either one of the tetracarboxylic acid components—i.e., one of the benzophenone tetracarboxylic acid component or the 2,3,3',4'-biphenyltetracarboxylic acid component—may be used, but it is preferable to combinedly use both the benzophenone tetracarboxylic acid component and the 2,3,3',4'-biphenyltetracarboxylic acid component. In doing so, the ratio between the benzophenone tetracarboxylic acid component and the 2,3,3',4'-biphenyltetracarboxylic acid component (i.e., the number of moles of the benzophenone tetracarboxylic acid component/the number of moles of the 2,3,3',4'-biphenyltetracarboxylic acid component) is preferably from 0.1 to 20, more preferably from 1 to 10, even more preferably from 1 to 5.

The main diamine component of the aromatic polyimide composing the polyimide foam of the invention is m-phenylenediamine. That is, 50 to 97% by mole, preferably 60 to 97% by mole, more preferably 70 to 97% by mole, even more preferably 80 to 95% by mole, of the diamine component is m-phenylenediamine. It is preferable that the m-phenylenediamine content in the diamine component is 50% by mole or higher, because this allows easy production of a polyimide foam having a glass transition temperature of at least 300° C., having fine and uniform foam cells, and having the mechanical properties required for practical use as a foam, such as flexibility that prevents the foam from cracking easily even when deformed and excellent cushioning properties. A m-phenylenediamine content below 50% by mole poses difficulty in achieving such properties. On the other hand, a m-phenylenediamine content exceeding 97% by mole poses difficulty in preparing a polyimide precursor in which the tetracarboxylic acid diesters and the diamines have been dispersed uniformly (dispersed at a molecular level) and thus does not allow easy production of a polyimide foam. The cushioning properties are also impaired.

As for the diamine component of the aromatic polyimide composing the polyimide foam of the invention, 4,4'-methylenedianiline is combinedly used with the main component, m-phenylenediamine. More specifically, in the diamine component, 50 to 3% by mole, preferably 40 to 3% by mole, more preferably 30 to 3% by mole, even more preferably 20 to 5% by mole, is 4,4'-methylenedianiline.

Combinedly using m-phenylenediamine with 4,4'-methylenedianiline facilitates the preparation of a uniformly-dispersed polyimide precursor (dispersed at a molecular level) and thus allows suitable production of a polyimide foam. In addition, the favorable properties—such as glass transition temperatures of at least 300° C., fine and uniform foam cells, flexibility that prevents the foam from cracking easily even when deformed, and excellent cushioning properties—that are attributed to m-phenylenediamine can suitably be retained.

In the polyimide foam of the invention, it is preferable to use the tetracarboxylic acid component and the diamine component in substantially equimolar amounts, and more specifically, in a range where the molar ratio (tetracarboxylic acid component/diamine component) is from 0.95 to 1.05.

The polyimide foam of the invention has uniform and fine foam cells. Foam cells may either be closed-celled or open-celled, but the term "foam cell" refers to a gas bubble regarded as having foamed as a single gas bubble during the foaming step in which the foam is formed. Accordingly, even if several gas bubbles are connected together into an open-celled structure after foaming, each gas bubble is considered a single foam cell. In the polyimide foam of the invention, the foam cells have a diameter of generally 5000 µm or less, preferably 3000 µm or less, more preferably from 0.1 to 2000 µm, even more preferably from 1 to 1000 µm. The term "generally" means that at least 80%, preferably at least 90%, of the cross-sectional area of the foam is made up of foam cells, and the term "diameter" of a foam cell refers to the maximum inner diameter of each foam cell found on the cross-sectional surface of the polyimide foam.

The polyimide foam of the invention has the mechanical properties required for practical use as a foam, such as flexibility that prevents the foam from cracking easily even when deformed and excellent cushioning properties. The "flexibility that prevents the foam from cracking easily even when deformed" is evaluated by visually observing whether cracks appear when a specimen of the polyimide foam with a 1-by-1-cm cross section and a length of 5 cm is deformed until the specimen's opposite ends, in its length direction, come into contact with each other and the specimen is deformed into a ring. The "cushioning properties" are evaluated by: compressing a 2-by-2-by-2-cm cubic specimen of the polyimide foam by applying a load on one surface of the specimen to a thickness of 0.2 cm (i.e., to one tenth of its original thickness before compression); holding the specimen in the compressed state for 30 seconds; releasing the load; and measuring the permanent strain after its thickness has recovered (i.e., measuring the unrecovered thickness) to find the percentage thereof to the thickness before compression.

The polyimide foam of the invention has at least such flexibility that no cracks appear even after conducting the above-described test for evaluating the flexibility, in which the polyimide foam is deformed into a ring, and also has at least such cushioning properties that the permanent strain is 30% or less, preferably 20% or less, more preferably 10% or less, even after conducting the above-described test for evaluating the cushioning properties. The present invention evaluates the present polyimide foam through such practical evaluation methods as those described above; the results show that the polyimide foam of the invention has extremely high mechanical properties as a foam.

Further, the polyimide foam of the invention has uniform and fine foam cells, and at least 80%, preferably at least 90%, of its cross-sectional area is made up of foam cells having a diameter ranging from 1 to 1000 µm.

The expansion ratio of the polyimide foam of the invention is preferably at least 50 times, more preferably at least 75 times, even more preferably at least 100 times, but preferably 500 times or less, more preferably 400 times or less. In cases where the expansion ratio is below 50 times, not only does the foam become stiff and the expected flexibility and cushioning properties become impossible to achieve, but also the characteristics and advantages that are generally expected of a foam, such as lightweightedness, can no longer be attained. On the other hand, expansion ratios exceeding 500 times will impair the mechanical properties and easily give rise to cracks upon deformation, thus posing difficulty in producing a polyimide foam having the mechanical properties required for practical use as a foam, such as flexibility and excellent cushioning properties.

The polyimide foam of the invention may preferably be produced according to the following method, although not limited thereto.

That is, the polyimide foam of the invention may suitably be produced by: preparing a polyimide precursor by dissolving, in a solvent, a tetracarboxylic acid ester derivative component composed of 0 to 90% by mole of a 3,3',4,4'-biphenyltetracarboxylic acid ester derivative and 100 to 10% by mole of a 3,3',4,4'-benzophenone tetracarboxylic acid ester derivative and/or a 2,3,3',4'-biphenyltetracarboxylic acid ester derivative, and a diamine component composed of 50 to 97% by mole of m-phenylenediamine and 50 to 3% by mole of 4,4'-methylenedianiline, to form a uniform solution (Step 1); and heating the polyimide precursor, to form a polyimide foam (Step 2).

The tetracarboxylic acid ester derivatives can easily be prepared by reacting dianhydrides of the tetracarboxylic acid components with a lower alkyl alcohol. More specifically, the ester derivatives can be produced easily by adding, to a lower alkyl alcohol, dianhydrides of the tetracarboxylic acid components composed of 0 to 90% by mole of 3,3',4,4'-biphenyltetracarboxylic acid dianhydride and 100 to 10% by mole of 3,3',4,4'-benzophenone tetracarboxylic acid dianhydride and/or 2,3,3',4'-biphenyltetracarboxylic acid dianhydride and also a catalyst, and causing the mixture to react at a low temperature of 120° C. or less for about 0.1 to 48 hours, preferably about 1 to 24 hours. This gives a solution of the tetracarboxylic acid ester derivatives in which the main components are diesters of the tetracarboxylic acid components.

Examples of the lower alkyl alcohol used herein preferably include $C_{1-6}$ lower alkyl alcohols, and concrete examples preferably include methanol, ethanol, propanol, butanol, and mixtures thereof.

Note that a catalyst for promoting polyimidization may be mixed in advance at the time of preparing the tetracarboxylic acid ester derivatives. Examples of such catalysts include: imidazoles such as 1,2-dimethylimidazole, 2-ethyl-4-methylimidazole, and benzimidazole; quinolines such as isoquinoline; pyridines such as pyridine; and amines such as 1,8-diaza-bicyclo(5,4,0)-7-undecene. Such compounds also serve as a catalyst for producing the tetracarboxylic acid ester derivatives from the tetracarboxylic acid dianhydrides and are therefore effective in shortening the production time.

Then, to the solution of the tetracarboxylic acid ester derivatives, a diamine component composed of 50 to 97% by mole of m-phenylenediamine and 50 to 3% by mole of 4,4'-methylenedianiline is added, and the mixture is made into a uniform solution. The uniform solution can be obtained by mixing and stirring the mixture preferably at a temperature of 60° C. or below (usually at room temperature, e.g., 24° C.) and preferably for 0.1 to 6 hours (usually 1 to 2 hours).

In the present invention, other additives, such as surfactants, catalysts, and flame retardants, may suitably be added to the polyimide precursor as necessary.

Examples of suitably-usable surfactants (foam stabilizers) include surfactants suitably used as foam stabilizers for polyurethane foams. Particularly preferable are polyether-modified silicone oils such as graft copolymers in which some of the methyl groups in polydimethylsiloxane have been substituted by polyalkylene oxide groups, such as polyethylene oxide, poly(ethylene-propylene)oxide, or propylene oxide (the end of the substituted polyalkylene oxide group is a hydroxyl group, an alkyl ether group such as methyl ether, or an alkylester group such as an acetyl group).

Concrete examples of the polyether-modified silicone oils include such commercially-available products as: SH-193, SH-192, SH-194, SH-190, SF-2937, SF-2908, SF-2904, SF-2964, SRX-298, SRX-2908, SRX-274C, SRX-295, SRX-294A, and SRX-280A (products of Dow Corning Toray Silicone Co., Ltd.); L-5340, SZ-1666, and SZ-1668 (products of Nippon Unicar Co., Ltd.); TFA4205 (product of GE Toshiba Silicones); X-20-5148, X-20-8046, X-20-8047, X-20-8048, X-20-8049, F-518, F-348, F-395, F-506, F-317M, KF-351A, KF-353A, KF-354L, and KP-101 (products of Shin-Etsu Chemical Co., Ltd.); and L6100J, L6100, L6884, L6887, L6900, L6970, and L5420 (products of Momentive Performance Materials Inc.).

Examples of catalysts that may be added to promote polyimidization include: imidazoles such as 1,2-dimethylimidazole, 2-ethyl-4-methylimidazole, and benzimidazole; quinolines such as isoquinoline; pyridines such as pyridine; and amines such as 1,8-diaza-bicyclo(5,4,0)-7-undecene.

The polyimide foam of the invention already has excellent flame-retardant properties, but phosphorus compounds, such as trivalent phosphite esters, may also be used to further improve its flame-retardant properties.

The polyimide foam of the invention may suitably be produced, for example, by simply heating the polyimide precursor obtained in the above-described Step 1 as-is in the form of a solution.

Alternatively, the polyimide foam of the invention may suitably be produced by heating a polyimide precursor powder that can be prepared easily by removing the solvent (e.g., alcohol) from the polyimide precursor solution.

Instead, the polyimide foam of the invention may suitably be produced by heating a green body prepared, for example, by compressing the polyimide precursor powder.

Alternatively, the polyimide foam of the invention may suitably be produced by heating a mixture (solution or slurry) prepared by mixing the polyimide precursor powder again with an appropriate solvent.

Instead, the polyimide foam of the invention may suitably be produced by first heating and melting the polyimide precursor powder within a temperature range that will not make the precursor foam to unite the powder into a fused product (plate) of the polyimide precursor, and then heating the fused product at temperatures that will make the polyimide precursor foam.

Powderization of the polyimide precursor can suitably be achieved by such methods as: evaporating the solvent from the polyimide precursor solution to allow the solute to dry and then grinding the resultant dried product (the solid); or performing powderization and evaporation of the solvent simultaneously using a spray dryer. Evaporation of the solvent is preferably done by heating at low temperatures that will not cause foaming, the temperature range being preferably 100° C. or below, more preferably 70° C. or below. Polyimide precursor powders produced by performing evaporation at temperatures higher than the above-described temperature range will have considerably poor foamability. Note that the solvent evaporation and powder drying may be done in normal pressure, in increased pressure, or in reduced pressure.

The green body can suitably be produced, for example, by filling the polyimide precursor powder into a mold at room temperature and compressing the same. Alternatively, the green body may be produced, for example, by dissolving the powder in an appropriate solvent, such as a lower alcohol, to prepare a polyimide precursor solution, casting the solution into a mold form, and evaporating the solvent to allow the polyimide precursor to dry.

In cases where the polyimide precursor powder is to be mixed again with a solvent, the polyimide precursor powder may be mixed with an appropriate amount of solvent, preferably a lower alcohol, to produce a mixture (a solution or slurry). Heat may be applied in the mixing step to prepare this mixture, but it is preferable to perform mixing preferably at a temperature of 100° C. or below, more preferably 60° C. or below, and even more preferably at room temperature or below without heating.

In heating and melting the polyimide precursor powder to form a fused product (plate) of the polyimide precursor, the polyimide precursor powder may be heated as-is, but is preferably heated and melted in a bag, such as a polyethylene bag. To effect melting in a short time, the polyimide precursor may be sandwiched between stainless-steel plates to facilitate heat conduction. The temperature for heating and melting is preferably 70° C. to 120° C. Temperatures exceeding 120° C. are likely to cause foaming at the time of melting, thus not preferable. Temperatures below 70° C., on the other hand, require a prolonged time for melting.

The heating process for foaming the polyimide precursor to produce a polyimide foam is not particularly limited as long as heating can be achieved for foaming. For example, heating can suitably be achieved using a heating device such as an oven or a microwave device. The conditions for the heating process (heating temperature, time, etc.) can be determined as appropriate depending on the type of polyimide precursor and amount to be processed.

In cases where an oven is to be used for heating, the heating process needs to be conducted in a temperature range of preferably from 80 to 200° C., more preferably from 100 to 180° C., even more preferably from 130 to 150° C., to effect foaming; the heating time is preferably around 5 to 60 minutes, more preferably around 10 to 30 minutes. Temperatures below the above-described heating temperature range require a prolonged time for foaming, thus not preferable. Temperatures above the above-described heating temperature range, on the other hand, pose difficulty in making the foam cells of the resulting polyimide foam uniform, thus not preferable.

In cases where a microwave heating device is to be used in Japan, heating is usually performed at the 2.45 GHz frequency pursuant to the Radio Law. Larger processing amounts of polyimide precursor require greater power output. For example, a power output ranging from 1 to 25 kW is suitably employed for several tens of grams to several thousands of grams of the polyimide precursor powder. Foaming will usually start in about 1 to 2 minutes after starting irradiation of microwaves and will settle down after 5 to 20 minutes of irradiation.

At the end of the foaming process—regardless of whether foaming is effected by heating in an oven or by microwave irradiation—the resultant polyimide foam will not have a sufficient mechanical strength. Accordingly, it is preferable to subject the resultant polyimide foam to post-heating using a heating device such as an oven.

Post-heating is dependent on the size of the resultant polyimide foam, but can suitably be conducted by heating at temperatures ranging from at least 200° C. to 10° C. above the glass transition temperature of the polyimide foam, and generally from 200 to 500° C., preferably from 200 to 400° C., for 5 minutes to 24 hours. For example, post-heating may be done by changing the heating temperatures according to a predetermined temperature profile that starts from a relatively low temperature, e.g. around 200° C., gradually rises at a temperature-rise rate of 10° C./minute, and finally becomes as high as around 350° C.

The heating process for foaming the polyimide precursor to produce a polyimide foam may be done in a mold form, although not limited thereto. Foaming-and-molding in a mold form, however, allows the foam to be shaped like the inner shape of the mold form, which increases the yield in the production of the polyimide foam.

The expansion ratio and the apparent density (density) can be controlled as appropriate by adjusting the various conditions, such as the amount of volatile components used in foaming (e.g., alcohol and water generated during polyimidization, solvents, and other volatile additives), the heating method, and the temperature profile employed during heating.

More specifically, the polyimide foam of the invention is made using a uniformly-dispersed polyimide precursor and also has foam cells made of a polyimide having a sufficiently large molecular weight. As a result, the present polyimide foam is provided with the mechanical properties required for practical use as a foam, such as flexibility that prevents the foam from cracking easily even when deformed and excellent cushioning properties.

As described above, the polyimide foam of the invention has uniform and fine foam cells that are formed of a polyimide having a sufficiently large molecular weight. This is why it is possible to suitably produce a soft polyimide foam having a high expansion ratio (low density) while exhibiting excellent flexibility and cushioning properties, and not just polyimide foams having low expansion ratios (high densities).

More specifically, the polyimide foam of the invention is a polyimide foam composed of a polyimide having a specific chemical composition, characterized in that: the foam has at least such flexibility that no cracks appear when a specimen of the polyimide foam with a 1-by-1-cm cross section and a length of 5 cm is deformed until the specimen's opposite ends, in its length direction, come into contact with each other and the specimen is deformed into a ring; or the foam has such cushioning properties that, when a 2-by-2-by-2-cm cubic specimen of the polyimide foam is compressed by applying a load on one surface of the specimen to a thickness of 0.2 cm, held in the compressed state for 30 seconds, and released from the load, the permanent strain in thickness is 30% or less; or at least 80% of its cross-sectional area is made up of foam cells having a diameter ranging from 1 to 1000 µm.

Further, the polyimide foam of the invention preferably has an expansion ratio of 75 to 500 times (an apparent density of 18.0 to 2.7 kg/m$^3$), more preferably an expansion ratio of 100 to 400 times (an apparent density of 13.5 to 3.4 kg/m$^3$), even more preferably an expansion ratio of 120 to 400 times (an apparent density of 11.3 to 3.4 kg/m$^3$). Although the polyimide foam of the invention is not limited to the above, the above-described expansion ratio range (apparent density range) allows easy production of a soft polyimide foam having the mechanical properties required for practical use as a foam, such as flexibility that prevents the foam from cracking easily even when deformed and excellent cushioning properties, and is thus preferable.

EXAMPLES

The present invention will now be described in further detail below according to Examples thereof. The invention, however, is not to be limited to the following.

In the Examples below, the abbreviations stand for the following compounds.

s-BPDA: 3,3',4,4'-biphenyltetracarboxylic acid dianhydride

BTDA: 3,3',4,4'-benzophenone tetracarboxylic acid dianhydride a-BPDA: 2,3',3,4'-biphenyltetracarboxylic acid dianhydride MPD: m-phenylenediamine MDA: 4,4'-methylenedianiline 1,2-DMz: 1,2-dimethylimidazole MeOH: methanol First, the measurement methods used in the invention will be described below. Note that particulars not specifically mentioned below are in compliance with JIS K-6400.

Foamability (Observation of Foam Cells):

A 2-by-2-by-2-cm specimen was cut out from a polyimide foam using a microtome, taking care so as not to apply any load. Photographs of the respective cross-sectional surfaces of the specimen were taken using a scanning electron microscope (SEM) at 20× magnification.

The foam specimen was conditioned at 25° C. and 50% RH for 24 hours before measurement, and the SEM measurement was conducted under the same conditions.

The SEM cross-sectional photographs were then analyzed using image-processing software ("Scion Image" from Scion Corporation). More specifically, the inner diameter of a given foam cell in the SEM cross-sectional photograph was found by clicking on one end of the cell and the dragging the cursor to the other end thereof. The area of a given foam cell was found by dragging the cursor around the perimeter of the foam cell, surrounding the same. The sum of the areas of the foam cells measured was divided by the total cross-sectional area, to calculate the percentage in area of the measured foam cells to the total cross-sectional area.

In the present invention, the above-described measurement was conducted for each cross-sectional surface of the specimen, and an average was found therefrom. The uniformity of the foam cells was evaluated to be: "good" in cases where the percentage of the sum of the cross-sectional areas of foam cells having diameters ranging from 1 to 1000 µm was 80% or above with respect to the total cross-sectional area; "fair" in cases where the percentage was below 80% but 50% or above; and "poor" in cases where the percentage was below 50%.

Flexibility:

A specimen with a 1-by-1-cm cross section and a length of 5 cm was cut out from a polyimide foam. The opposite ends, in the length direction, of the specimen were held, and the specimen was deformed in about 5 seconds until the opposite ends came into contact with each other and the specimen was shaped like a ring. The specimen was visually observed for any cracks, and the flexibility was evaluated to be: "poor" in cases where the specimen cracked into two; "fair" in cases where cracks appeared but the specimen did not break into two; and "good" in cases where no cracks appeared.

The foam specimen was conditioned at 25° C. and 50% RH for 24 hours before measurement, and the measurement was conducted under the same conditions.

Cushioning Properties:

A 2-by-2-by-2-cm cubic specimen was cut out from a polyimide foam. Using a tensile/compression tester ("Orientec Tensilon RPA-500" from Orientec Co., Ltd.), the specimen was compressed by applying a load from its top surface to a thickness of 0.2 cm (i.e., to one tenth of its original thickness before compression) while keeping its top surface and bottom surface parallel to one another, was kept in that state for 30 seconds, and then released from the load, and the permanent strain at the time of recovery from the thickness after the 30-second compression (i.e., the unrecovered thickness) was measured. The percentage of the permanent strain with respect to the thickness before compression was employed to evaluate the cushioning properties. Permanent strain ranging from 0% to 30% was evaluated as "good," and permanent strain exceeding 30% was evaluated as "poor." For anisotropic specimens, the measurement values found in the three directions were averaged.

The foam specimen was conditioned at 25° C. and 50% RH for 24 hours before measurement, and the measurement was conducted under the same conditions.

Apparent Density (Density of Polyimide Foam):

A 50-by-50-by-50-mm cube was cut out from a polyimide foam and weighed, to calculate the apparent density.

The foam specimen was conditioned at 25° C. and 50% RH for 24 hours before measurement, and the measurement was conducted under the same conditions.

Expansion Ratio:

A polyimide film was prepared from the same tetracarboxylic acid component and diamine component making up a polyimide foam to be examined. The maximum heating temperature for preparing the film was set equal to the heating temperature of the polyimide foam. The density (true density) of the polyimide film was determined using a density gradient tube and a pycnometer.

The true density of the polyimide film was divided by the apparent density of the polyimide foam, to calculate the expansion ratio.

The specimen was conditioned at 25° C. and 50% RH for 24 hours before measurement, and the measurement was conducted under the same conditions.

Dynamic Viscoelasticity:

A foam specimen was set to a solid viscoelasticity analyzer "RSA III" from TA Instruments (compression mode: dynamic measurement; frequency: 62.8 rad/sec (10 Hz); strain amount: set to 3% of the specimen height). In a nitrogen flow atmosphere, repetitive measurement was conducted in the temperature range starting from −140° C. up to 450° C. by: incrementing the temperature by 3° C.; conducting measurement 30 seconds after reaching each target temperature; and then raising the temperature again to the next target temperature. In this way, the maximum of the loss elastic modulus (E") was found, and the temperature at that point was determined to be the glass transition point (Tg).

The foam specimen was first conditioned at 25° C. and 50% RH for 24 hours before measurement, and the measurement was conducted thereafter.

Shapeability:

Fifty (50) grams of polyimide precursor powder was spread on a 150-by-150-by-150-mm container (without a lid), pre-heated at 120° C. for 30 minutes, and then irradiated with microwaves using a microwave oven ("MOH" from Micro Denshi Co., Ltd.) at 1.5 kW for 10 minutes, to foam the polyimide precursor powder and thus give a polyimide foam. The foam was then placed in a hot air oven ("STPH-201" from Espec Corp.) set to 200° C. and subjected to post-heating for 1 hour such that the maximum temperature was 10° C. higher than Tg of the foam.

The resultant polyimide foam was visually observed to see whether it foamed uniformly to a degree that the distance (space) between each side of the foam and the opposing inner surface of the container was 5 mm or less (i.e., there was no space exceeding 5 mm). Also, the polyimide foam was sliced up, and the cut face of each sliced piece was visually observed to see whether there were any cells with diameters of 3 mm or larger or any cavities (voids) inside the foam.

The shapeability was evaluated to be "good" in cases where the polyimide foam foamed uniformly to a degree that the distance between the polyimide foam and the respective inner surfaces of the container was 5 mm or less and there were no cells with diameters of 3 mm or larger nor cavities (voids) inside the foam; otherwise, the shapeability was evaluated to be "poor."

Example 1

To a 1000 mL recovery flask were placed 40.0072 g (0.1360 mol) of s-BPDA, 18.7884 g (0.0583 mol) of BTDA, 121.30 g (3.79 mol) of MeOH, and 0.8717 g (0.0091 mol) of 1,2-DMz, and the mixture was heated under reflux, while being stirred, in an 80° C. oil bath for 2 hours, to esterify s-BPDA and BTDA and give a uniform solution. The solution was cooled to room temperature, and to this solution were added 19.9605 g (0.1846 mol) of MPD and 1.9246 g (0.0097 mol) of MDA as aromatic diamine components and 1.8781 g of "L6100J" (product of Momentive Performance Materials Inc.) as a silicone-based surfactant, and the mixture was stirred, to give a uniform solution without creating any precipitate. The solvent, MeOH, was removed from the solution with an evaporator to concentrate the solution, and the solute was dried at room temperature with a vacuum drying oven, to give a solid. The resultant solid was finely ground using a mortar, to give a polyimide precursor powder. The polyimide precursor powder was then spread on a 150-by-150-by-150-mm container, pre-heated at 120° C. for 30 minutes, and then irradiated with microwaves using a microwave oven ("MOH" from Micro Denshi Co., Ltd.) at 1.5 kW for 10 minutes, to foam the polyimide precursor powder and thus give a polyimide foam. The foam was then placed in a hot air oven ("STPH-201" from Espec Corp.) set to 200° C. and subjected to post-heating for 1 hour at a maximum temperature of 330° C. The resultant polyimide foam had Tg of 320° C. and had fine and uniform foam cells ("good" foamability). The results are shown in Table 1.

Example 2

A polyimide foam was produced as in Example 1, except that s-BPDA, BTDA, and a-BPDA were used as the tetracarboxylic acid components at a molar ratio of 70:20:10, and MPD and MDA were used as the diamine components at a molar ratio of 90:10. The resultant polyimide foam had Tg of 323° C. and had fine and uniform foam cells ("good" foamability). The results are shown in Table 1.

Example 3

A polyimide foam was produced as in Example 1, except that s-BPDA, BTDA, and a-BPDA were used as the tetracarboxylic acid components at a molar ratio of 60:30:10, and MPD and MDA were used as the diamine components at a molar ratio of 95:5. The resultant polyimide foam had Tg of 323° C. and had fine and uniform foam cells ("good" foamability). The results are shown in Table 1.

Example 4

A polyimide foam was produced as in Example 1, except that s-BPDA, BTDA, and a-BPDA were used as the tetracarboxylic acid components at a molar ratio of 60:30:10, and MPD and MDA were used as the diamine components at a molar ratio of 90:10. The resultant polyimide foam had Tg of 320° C. and had fine and uniform foam cells ("good" foamability). The results are shown in Table 1.

Example 5

A polyimide foam was produced as in Example 1, except that s-BPDA, BTDA, and a-BPDA were used as the tetracarboxylic acid components at a molar ratio of 60:30:10, and MPD and MDA were used as the diamine components at a molar ratio of 80:20. The resultant polyimide foam had Tg of 315° C. and had fine and uniform foam cells ("good" foamability). The results are shown in Table 1.

Example 6

A polyimide foam was produced as in Example 1, except that s-BPDA, BTDA, and a-BPDA were used as the tetracarboxylic acid components at a molar ratio of 55:30:15, and MPD and MDA were used as the diamine components at a molar ratio of 90:10. The resultant polyimide foam had Tg of 320° C. and had fine and uniform foam cells ("good" foamability). The results are shown in Table 1.

Example 7

A polyimide foam was produced as in Example 1, except that s-BPDA, BTDA, and a-BPDA were used as the tetracarboxylic acid components at a molar ratio of 40:30:30, and MPD and MDA were used as the diamine components at a molar ratio of 90:10. The resultant polyimide foam had Tg of 324° C. and had fine and uniform foam cells ("good" foamability). The results are shown in Table 1.

Example 8

A polyimide foam was produced as in Example 1, except that s-BPDA and a-BPDA were used as the tetracarboxylic acid components at a molar ratio of 60:40, and MPD and MDA were used as the diamine components at a molar ratio of 90:10. The resultant polyimide foam had Tg of 335° C. and had fine and uniform foam cells ("good" foamability). The results are shown in Table 1.

Example 9

A polyimide foam was produced as in Example 1, except that BTDA and a-BPDA were used as the tetracarboxylic acid components at a molar ratio of 20:80, and MPD and MDA were used as the diamine components at a molar ratio of 95:5. The resultant polyimide foam had Tg of 313° C. and had fine and uniform foam cells ("good" foamability). The results are shown in Table 1.

Comparative Example 1

To a 1000 mL recovery flask were placed 50.3757 g (0.1712 mol) of s-BPDA, 102.04 g (3.19 mol) of MeOH, and 0.6840 g (0.0071 mol) of 1,2-DMz, and the mixture was heated under reflux, while being stirred, in an 80° C. oil bath for 2 hours, to esterify s-BPDA and give a uniform reaction solution. The reaction solution was cooled to room temperature, and to this solution were added 18.5139 g (0.1721 mol) of MPD as a diamine component and 1.2586 g of "L6100J" (product of Momentive Performance Materials Inc.) as a silicone-based surfactant. Stirring this mixture for 1 hour gave a precipitate. The precipitate was filtered by suction, and the solid was dried at room temperature with a vacuum drying oven. The resultant solid was irradiated with microwaves using a microwave oven, but did not foam. The results are shown in Table 1.

Comparative Example 2

The procedure was conducted as in Comparative Example 1, except that the molar ratio of the tetracarboxylic acid components s-BPDA and BTDA was changed to 95:5. A precipitate was formed 3 hours after adding MPD. The resultant solid did not foam, as with Comparative Example 1. The results are shown in Table 1.

Comparative Example 3

A polyimide foam was produced as in Example 1, except that the molar ratio of the tetracarboxylic acid components s-BPDA and BTDA was changed to 80:20, and MPD was used as the diamine. The resultant polyimide foam had Tg of 325° C., but had poor cushioning properties. The results are shown in Table 1.

Comparative Example 4

A polyimide foam was produced as in Example 1, except that the molar ratio of the tetracarboxylic acid components s-BPDA and BTDA was changed to 70:30, and MPD was used as the diamine. The resultant polyimide foam had Tg of 323° C., but had poor cushioning properties. The results are shown in Table 1.

Comparative Example 5

A polyimide foam was produced as in Example 1, except that the tetracarboxylic acid component was changed to BTDA, and the diamine component was changed to MDA. The resultant polyimide foam had fine and uniform foam cells, but Tg was at 260° C., which was insufficient. The results are shown in Table 1.

Comparative Example 6

The procedure was conducted as in Comparative Example 1, except that the molar ratio of the tetracarboxylic acid components s-BPDA and BTDA was changed to 95:5, and the molar ratio of the diamine components MPD and MDA was changed to 90:10. A precipitate was formed 3 hours after adding the diamines. The resultant solid did not foam, as with Comparative Example 1. The results are shown in Table 1.

Comparative Example 7

The procedure was conducted as in Comparative Example 1, except that the molar ratio of the tetracarboxylic acid components s-BPDA and BTDA was changed to 95:5, and the molar ratio of the diamine components MPD and MDA was changed to 80:20. A precipitate was formed 5 hours after adding the diamines. The resultant solid did not foam, as with Comparative Example 1. The results are shown in Table 1.

Comparative Example 8

The procedure was conducted as in Comparative Example 1, except that s-BPDA was used as the tetracarboxylic acid component, and the diamine component was changed to MDA. A precipitate was formed 30 minutes after adding MDA. The resultant solid did not foam, as with Comparative Example 1. The results are shown in Table 1.

Comparative Example 9

A polyimide foam was produced as in Example 1, except that the molar ratio of the tetracarboxylic acid components a-BPDA and BTDA was changed to 20:80, and the diamine was changed to MDA. The resultant polyimide foam had fine and uniform foam cells, but Tg was at 270° C., which was insufficient. The results are shown in Table 1.

and preferably has the mechanical properties required for practical use as a foam, such as flexibility that prevents the foam from cracking easily even when deformed and excellent cushioning properties, as well as heat resistance that can resist use at high temperatures.

The invention claimed is:

1. A polyimide foam made of an aromatic polyimide having a repeating unit represented by chemical formula (1) shown below:

[Chem. 1]

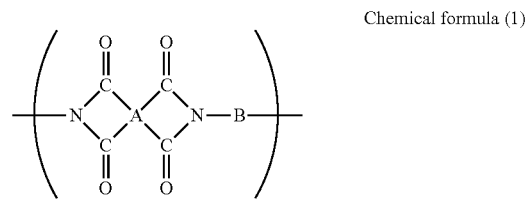

Chemical formula (1)

TABLE 1

|  |  | Example 1 | Example 2 | Example 3 | Example 4 | Example 5 | Example 6 | Example 7 | Example 8 | Example 9 |
|---|---|---|---|---|---|---|---|---|---|---|
| Acid component (mol %) | s-BPDA | 70 | 70 | 60 | 60 | 60 | 55 | 40 | 60 | |
| | BTDA | 30 | 20 | 30 | 30 | 30 | 30 | 30 | | 20 |
| | a-BPDA | | 10 | 10 | 10 | 10 | 15 | 30 | 40 | 80 |
| Diamine component (mol %) | MPD | 95 | 90 | 95 | 90 | 80 | 90 | 90 | 90 | 95 |
| | MDA | 5 | 10 | 5 | 10 | 20 | 10 | 10 | 10 | 5 |
| Foam Properties | Foamability | good | good | good | good | good | good | good | good | good |
| | Shapeability | good | good | good | good | good | good | good | good | good |
| | Tg (° C.) | 320 | 323 | 323 | 320 | 315 | 320 | 324 | 335 | 313 |
| | Flexibility | good | good | good | good | good | good | good | good | good |
| | Cushioning properties | good | good | good | good | good | good | good | good | good |
| | Expansion ratio | 156 | 216 | 204 | 207 | 205 | 211 | 203 | 212 | 188 |
| | Apparent density (kg/m$^3$) | 8.65 | 6.25 | 6.62 | 6.52 | 6.59 | 6.41 | 6.65 | 6.68 | 7.18 |
|  |  | Comp. Example 1 | Comp. Example 2 | Comp. Example 3 | Comp. Example 4 | Comp. Example 5 | Comp. Example 6 | Comp. Example 7 | Comp. Example 8 | Comp. Example 9 |
| Acid component (mol %) | s-BPDA | 100 | 95 | 80 | 70 | | 95 | 95 | 100 | |
| | BTDA | | 5 | 20 | 30 | 100 | 5 | 5 | | 20 |
| | a-BPDA | | | | | | | | | 80 |
| Diamine component (mol %) | MPD | 100 | 100 | 100 | 100 | | 90 | 80 | | |
| | MDA | | | | | 100 | 10 | 20 | 100 | 100 |
| Foam Properties | Foamability | no foam | no foam | good | good | good | no foam | no foam | no foam | good |
| | Shapeability | — | — | good | good | good | — | — | — | good |
| | Tg (° C.) | — | — | 325 | 323 | 260 | — | — | — | 270 |
| | Flexibility | — | — | good | good | good | — | — | — | good |
| | Cushioning properties | — | — | poor | poor | good | — | — | — | good |
| | Expansion ratio | — | — | 218 | 203 | 160 | — | — | — | 198 |
| | Apparent density (kg/m$^3$) | — | — | 6.19 | 6.65 | 8.43 | — | — | — | 6.82 |

INDUSTRIAL APPLICABILITY

The present invention can provide a novel polyimide foam made of an aromatic polyimide having a specific chemical structure, and a method for producing the same. The polyimide foam can be produced easily, has uniform and fine cells, wherein, 40 to 70% by mole of A in the chemical formula (1) is a tetravalent unit based on a biphenyltetracarboxylic acid structure represented by chemical formula (2) shown below, and 60 to 30% by mole of A is a combination of a tetravalent unit based on a benzophenone tetracarboxylic acid structure represented by chemical formula (3) shown below and a tetravalent unit based on a biphenyltetracarboxylic acid structure represented by chemical formula (4) shown below:

[Chem. 2]

Chemical formula (2)

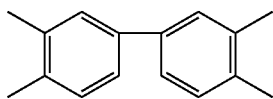

[Chem. 3]

Chemical formula (3)

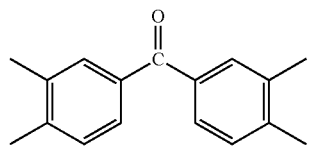

[Chem. 4]

Chemical formula (4)

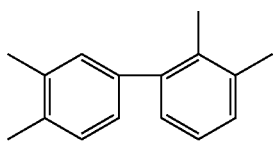

and 50 to 97% by mole of B in the chemical formula (1) is a divalent unit based on a m-phenylene structure represented by chemical formula (5) shown below, and 50 to 3% by mole of B is a divalent unit based on a diphenylmethane structure represented by chemical formula (6) shown below:

[Chem. 5]

Chemical formula (5)

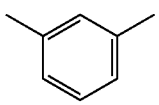

[Chem. 6]

Chemical formula (6)

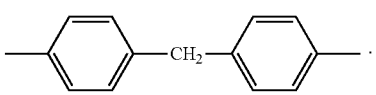

2. The polyimide foam according to claim 1, characterized by having at least such flexibility that no cracks appear when a specimen of the polyimide foam with a 1-by-1-cm cross section and a length of 5 cm is deformed until the specimen's opposite ends, in its length direction, come into contact with each other and the specimen is deformed into a ring.

3. The polyimide foam according to claim 1, characterized by having such cushioning properties that, when a 2-by-2-by-2-cm cubic specimen of the polyimide foam is compressed by applying a load on one surface of the specimen to a thickness of 0.2 cm, held in the compressed state for 30 seconds, and released from the load, the permanent strain in thickness is 30% or less.

4. The polyimide foam according to claim 1, wherein the aromatic polyimide has a glass transition temperature of at least 300° C.

5. The polyimide foam according to claim 1, where the polyimide foam has an expansion ratio of at least 75.

6. A method for producing a polyimide foam, comprising:
preparing a polyimide precursor by uniformly dispersing an aromatic tetracarboxylic acid diester component composed of 40 to 40% by mole of a 3,3',4,4'-biphenyltetracarboxylic acid diester and 30 to 60% by mole of a combination of a 3,3',4,4'-benzophenone tetracarboxylic acid diester and a 2,3,3',4'-biphenyltetracarboxylic acid diester, and an aromatic diamine component composed of 50 to 97% by mole of m-phenylenediamine and 50 to 3% by mole of 4,4'-methylenedianiline; and
then heating the polyimide precursor.

7. The polyimide foam production method according to claim 6, wherein the polyimide precursor contains a polyimidization catalyst.

8. The polyimide foam production method according to claim 6, wherein the polyimide precursor contains a surfactant.

9. The polyimide foam according to claim 2, characterized by having such cushioning properties that, when a 2-by-2-by-2-cm cubic specimen of the polyimide foam is compressed by applying a load on one surface of the specimen to a thickness of 0.2 cm, held in the compressed state for 30 seconds, and released from the load, the permanent strain in thickness is 30% or less.

10. The polyimide foam according to claim 2, wherein the aromatic polyimide has a glass transition temperature of at least 300° C.

11. The polyimide foam according to claim 3, wherein the aromatic polyimide has a glass transition temperature of at least 300° C.

12. The polyimide foam according to claim 2, where the polyimide foam has an expansion ratio of at least 75.

13. The polyimide foam according to claim 3, where the polyimide foam has an expansion ratio of at least 75.

14. The polyimide foam according to claim 4, where the polyimide foam has an expansion ratio of at least 75.

* * * * *